(12) United States Patent
Lux

(10) Patent No.: US 8,077,446 B1
(45) Date of Patent: Dec. 13, 2011

(54) MOLTEN DIELECTRIC CAPACITOR ENERGY STORAGE SYSTEM

(76) Inventor: Kim Lux, Calgary (CA)

( * ) Notice: Subject to any disclaimer, the term of this patent is extended or adjusted under 35 U.S.C. 154(b) by 642 days.

(21) Appl. No.: 12/114,362

(22) Filed: May 2, 2008

(51) Int. Cl.
*H01G 4/02* (2006.01)

(52) U.S. Cl. ...................................... 361/327

(58) Field of Classification Search .................. 361/327, 361/517–520, 535–538
See application file for complete search history.

(56) References Cited

U.S. PATENT DOCUMENTS

| | | | |
|---|---|---|---|
| 1,635,556 A * | 7/1927 | Marbury ....................... | 361/327 |
| 2,450,650 A * | 10/1948 | Flowers et al. ............... | 361/327 |
| 2,947,926 A * | 8/1960 | Murch ......................... | 361/327 |
| 3,279,030 A | 10/1966 | Wagner et al. | |
| 3,506,887 A | 4/1970 | Gutteridge | |
| 3,639,164 A | 2/1972 | Girard | |
| 3,825,802 A | 7/1974 | Kumagai et al. | |
| 4,259,365 A | 3/1981 | Ruppel et al. | |
| 6,292,355 B1 | 9/2001 | Kang et al. | |
| 6,347,033 B1 | 2/2002 | Minnick et al. | |
| 6,791,820 B1 | 9/2004 | Varakin et al. | |

FOREIGN PATENT DOCUMENTS

JP 01307210 A * 12/1989

OTHER PUBLICATIONS

Pan'Kovay et al., "The giant dielectric constant of opal containing sodium nitrate nanoparticles", Letter to the Editor, J. Phys., Matter 8 (1996), L203-206.
Fokin et al., "Temperature Evolution of Sodium Nitrite Structure in a Restricted Geometry", Feb. 1, 2008.

* cited by examiner

*Primary Examiner* — Eric Thomas
(74) *Attorney, Agent, or Firm* — David A. Guerra

(57) ABSTRACT

A molten dielectric capacitor energy storage system for storing and providing power to an electric motorized vehicle. The molten dielectric capacitor energy storage system has an outer shell defining a hollow interior, a first conductive electrode with at least one first conductive plate, a second conductive electrode with at least one second conductive plate, and a dielectric material made of at least opal and sodium nitrite located in the hollow interior of the outer shell said. The first and second conductive plates are located in the hollow interior of the outer shell adjacent to each other defining a gap therebetween and are immersed in the dielectric material. A heating element is used to maintain the dielectric material in a molten phase.

15 Claims, 9 Drawing Sheets

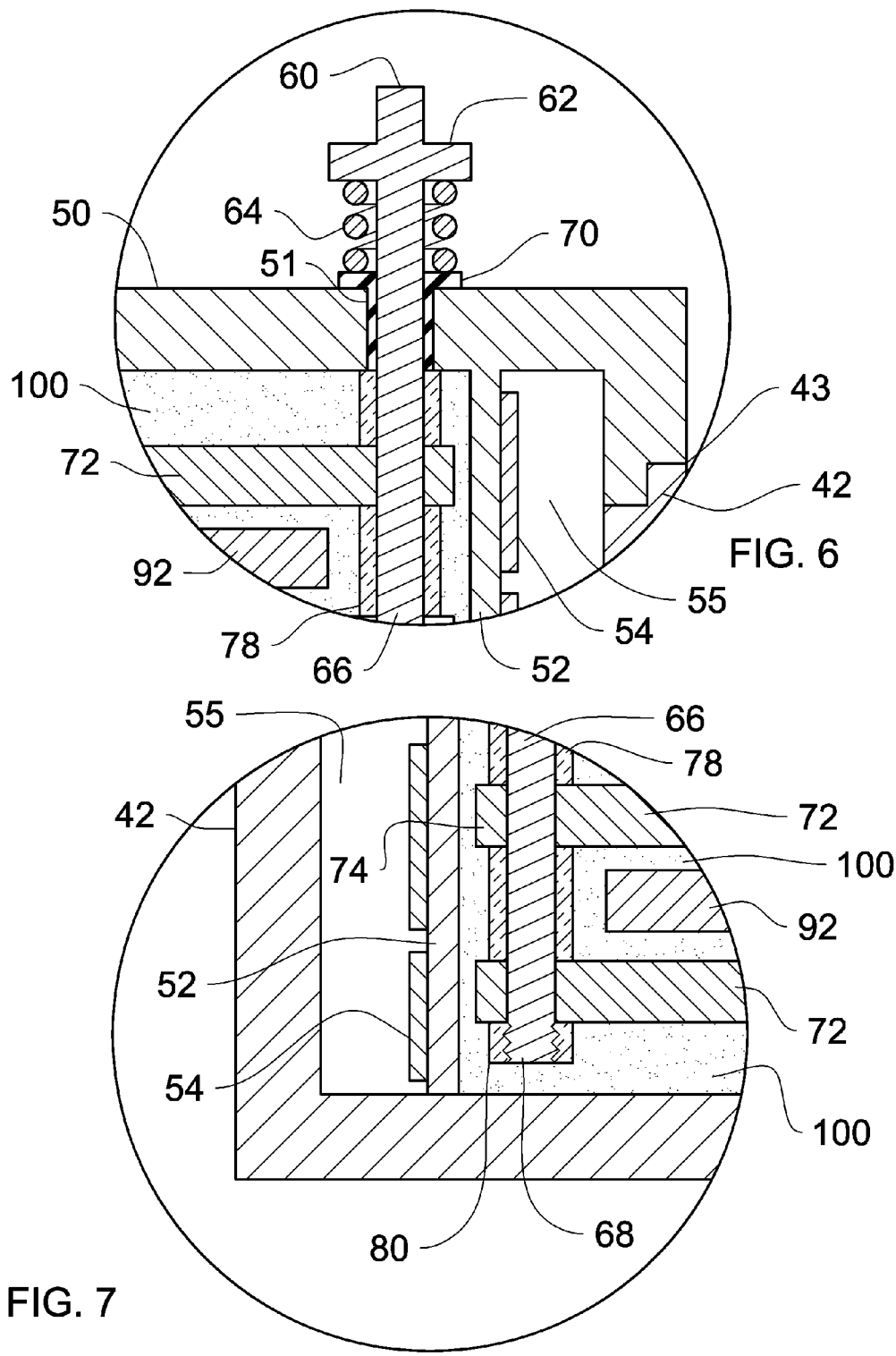

MOLTEN DIELECTRIC CAPACITOR ENERGY STORAGE SYSTEM

CROSS-REFERENCE TO RELATED APPLICATION

Not applicable

FEDERALLY SPONSORED RESEARCH

Not applicable

SEQUENCE LISTING OR PROGRAM

Not applicable

BACKGROUND OF THE INVENTION

1. Field of the Invention

The present invention relates to a molten dielectric capacitor energy storage system for use in connection with storing and providing power to a load with increased capacitor permittivity, also known as dielectric constant.

2. Description of the Prior Art

Molten dielectric capacitor energy storage systems are desirable for use in electrically powered vehicles because of their quick charge and discharge cycles, their high charge and discharge efficiency, their no charge memory effect, and that they are solid state devices with no electrochemical reaction as in a battery.

The use of capacitors is known in the prior art. For example: U.S. Pat. No. 3,825,802; U.S. Pat. No. 3,279,030; U.S. Pat. No. 6,292,355; U.S. Pat. No. 4,259,365; U.S. Pat. No. 3,506,887; and U.S. Pat. No. 3,639,164.

While the above-described devices fulfill their respective, particular objectives and requirements, the aforementioned patents do not describe a molten dielectric capacitor energy storage system that allows for the storing and providing of power to a load with increased capacitor permittivity and dielectric constant.

The present capacitor systems are not feasible power storage solutions for electrically powered vehicles because of their low mass and volume energy densities (KWHr/Kg and KWHr/liter). This problem is caused by the lack of dielectric material with a high energy storage capacity. Present capacitors commonly use Barium titanate as the dielectric material, which has a relative permittivity or dielectric constant of 1250 to 10,000 at 20°-120° C. respectively. Using standard and present day capacitors to power an electrical vehicle would result in large, heavy capacitors relative to the amount of energy they can store and provide. High capacity capacitors such as the one manufactured by EEstor have a dielectric material with a relative permittivity of 18,500. It can be appreciated by one skilled in the art that the current high capacity capacitors do not have the relative permittivity too effectively and efficiently provide and store energy to power an electric vehicle. Additionally, the energy storage in a dielectric is the product of the breakdown voltage squared, multiplied by the dielectric constant. The capacitor from EEstor obtains its high storage density by improving the breakdown voltage, not by increasing the dielectric constant as described herewith in the present invention.

It is well known in the industry that most commonly available capacitors are designed and rated to operate at or near room temperatures, with their dielectric materials designed to be a solid during normal operation.

A need exists for a new and improved molten dielectric capacitor energy storage system that can be used for storing and providing power to a load with increased capacitor permittivity and dielectric constant. In this regard, the present invention substantially fulfills this need. In this respect, the molten dielectric capacitor energy storage system according to the present invention substantially departs from the conventional concepts and designs of the prior art, and in doing so provides an apparatus primarily developed for the purpose of storing and providing power to a load with increased capacitor permittivity and dielectric constant.

SUMMARY OF THE INVENTION

In view of the foregoing disadvantages inherent in the known types of high capacity capacitors now present in the prior art, the present invention provides an improved molten dielectric capacitor energy storage system, and overcomes the above-mentioned disadvantages and drawbacks of the prior art. As such, the general purpose of the present invention, which will be described subsequently in greater detail, is to provide a new and improved molten dielectric capacitor energy storage system and method which has all the advantages of the prior art mentioned heretofore and many novel features that result in a molten dielectric capacitor energy storage system which is not anticipated, rendered obvious, suggested, or even implied by the prior art, either alone or in any combination thereof.

To attain this, the present invention essentially comprises a molten dielectric capacitor energy storage system including an outer shell defining a hollow interior, a first conductive electrode with at least one first conductive plate, a second conductive electrode with at least one second conductive plate, and a dielectric material made of at least opal and sodium nitrite located in the hollow interior of the outer shell said. The first and second conductive plates are located in the hollow interior of the outer shell adjacent to each other defining a gap therebetween and immersed in the opal and sodium nitrite dielectric material.

Additionally, the first and second conductive plates can each include a plurality of corresponding first and second conductive plates in parallel with each other and sequentially connectable to their respective first and second conductive electrode. Furthermore, the second conductive plates are disposed in alternation with the first conductive plates.

There has thus been outlined, rather broadly, the more important features of the invention in order that the detailed description thereof that follows may be better understood and in order that the present contribution to the art may be better appreciated.

The invention may also include a cover including an inner shell and a heating element fixed to the heating element. Additionally, the first and second electrodes may each include a head larger than their corresponding electrode and a spring located between the head and the cover so as to provide a clamping force of the first and second conductive plates. There are, of course, additional features of the invention that will be described hereinafter and which will form the subject matter of the claims attached.

The dielectric of the present invention is a composite of a confining nanostructure with spaces, preferably opal, and a molten ferroelectric material, preferably Sodium Nitrate, operating in a molten phase or above their Currie point or temperature. Other nanostructures can be used instead of opal, such as but not limited to asbestos, and zeolites.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved molten dielectric capacitor energy storage system that has all of the advantages of the prior art high capacity capacitors and none of the disadvantages.

It is another object of the present invention to provide a new and improved molten dielectric capacitor energy storage system that may be easily and efficiently manufactured and marketed.

An even further object of the present invention is to provide a new and improved molten dielectric capacitor energy storage system that has a low cost of manufacture with regard to both materials and labor, and which accordingly is then susceptible of low prices of sale to the consuming public, thereby making such molten dielectric capacitor energy storage system economically available to the buying public.

Still another object of the present invention is to provide a new molten dielectric capacitor energy storage system that provides in the apparatuses and methods of the prior art some of the advantages thereof, while simultaneously overcoming some of the disadvantages normally associated therewith.

Even still another object of the present invention is to provide a molten dielectric capacitor energy storage system for providing power to a load with increased capacitor permittivity (dielectric constant). This allows for a capacitor having a high energy storage capacity with quick charge and discharge cycles, high charge and discharge efficiency, no charge memory effect, and a solid state design with no electrochemical reaction.

Lastly, it is an object of the present invention to provide a new and improved system for providing power to an electric motor of a vehicle with high permittivity and controllable output voltage and capacitance through the heating and/or cooling of the o-NaNO2 dielectric material.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an enlarged view of the molten dielectric capacitor energy storage system of the present invention.

FIG. 7 is an enlarged view of the molten dielectric capacitor energy storage system of the present invention.

The same reference numerals refer to the same parts throughout the various figures.

DESCRIPTION OF THE PREFERRED EMBODIMENT

Figure 2:
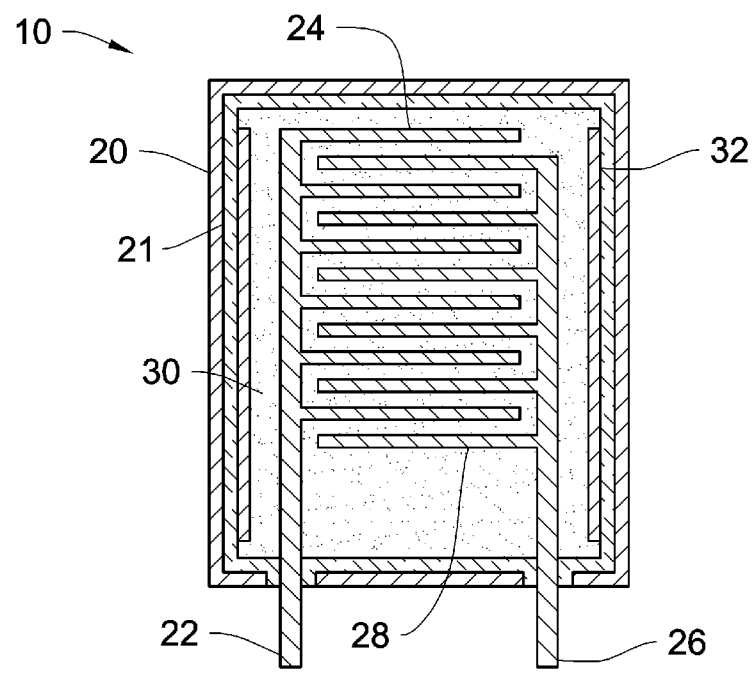
FIG. 2 is a cross sectional view of the molten dielectric capacitor energy storage system of the present invention.

Referring now to the drawings and particularly to FIGS. 1-12, an embodiment of the molten dielectric capacitor energy storage system of the present invention is shown and generally designated by the reference numeral 10.

Figure 1:
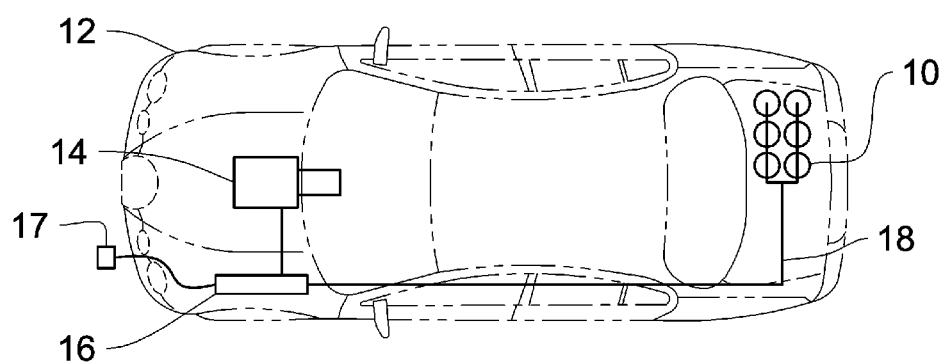
FIG. 1 is a top elevation view of the preferred embodiment of the molten dielectric capacitor energy storage system constructed in accordance with the principles of the present invention, with the phantom lines depicting environmental structure and which may form no part of the claimed invention.

In FIG. 1, a new and improved molten dielectric capacitor energy storage system 10 of the present invention for storing and providing power to a load with increased capacitor permittivity and dielectric constant is illustrated and will be described. More particularly, the molten dielectric capacitor energy storage system 10 is used to store and provide power to a load, such as but not limited to an electrically powered vehicle 12. The vehicle 12 can be any mode of transportation which includes an electric motor 14 featuring a drive train, a control system 16, and power and communication wiring 18. The vehicle 12 can be but not limited to automobiles, marine vessels, submersible vessels, motorcycles, trains, aircrafts, unmanned vehicles, and spacecrafts. It can be appreciated that the molten dielectric capacitor energy storage system 10 can be used to power any external electric load. The molten dielectric capacitor energy storage system 10 is connected to the control system 16 via wirings 18, and the control system 16 includes a power connection and cable 17 allowing for the charging and/or discharging of the molten dielectric capacitor energy storage system 10. The control system 16 controls and transfers the power from the molten dielectric capacitor energy storage system 10 to the electric motor 14, and the transfer of power between the molten dielectric capacitor and an external system through power connection 17. The control system 16 can include an inverter/converter for converting the power to or from the molten dielectric capacitor between AC to DC and DC to AC. The external system can be but not limited to an AC or DC power grid, an electric device, an external power source, or any other system able to transmit or receive electric power. It is appreciated that the molten dielectric capacitor energy storage system 10 can be used as an independent energy storage device including the control system 16, and not affiliated with a vehicle 12.

In its broadest and simplest description, the molten dielectric capacitor energy storage system 10 has an outer shell 20, an insulted layer/shell 21, a first conductive (positive) jumper bar or electrode 22, and a second conductive (negative) jumper bar or electrode 26, as best illustrated in FIG. 2. The first conductive jumper bar 22 is connected to a plurality of first conductive (positive) plates 24 spaced in parallel and in sequence so as to provide a gap between each adjacent first conductive plate 24 thereby producing an array of first conductive plates. The second conductive jumper bar 26 is connected to a plurality of second conductive (negative) plates 28 spaced in parallel and in sequence so as to provide a gap between each adjacent second conductive plate 28 thereby producing an array of second conductive plates. The array of first and second conductive plates 24, 28 are arranged so as to fit into the gap of the other plate array so as to provide a gap between each of the fitted first and second conductive plate arrays 24, 28. The assembled first and second conductive arrays 24, 28 and their respective jumper bars 22, 26 are placed in the interior of the outer shell 20. The first and second conductive jumper bars 22, 26 each extend out from the outer shell 20 to a respective first and second conductive terminal. A dielectric material 30 is provided or filled within the interior of the outer shell 20 thereby encasing the first and second conductive plates 24, 28, as necessary to keep the dielectric structure flooded with the molten material 30. The first and second conductive jumper bars 22, 26 are then connected by wirings 18 to the control system 16 which consists of a charge and discharge control circuitry. The dielectric material 30 is composed of a nanomatrix material with a molten ferroelectric material embedded therein. The nanomatrix is opal and the molten ferroelectric material is sodium nitrite which is abbreviated as o-NaNO2, referred to hereinafter as dielectric material 30.

It has been discovered that opal containing a regular three-dimensional array of nanosized sodium nitrite particles displays interesting dielectric properties, particularly the occurrence of size effects in the phase transitions of sodium nitrite nanoparticles. The substantial increase of dielectric constant is associated with the interaction of liquid sodium nitrite particles with each other and with silica spheres of the opal matrix. The dielectric constant of the o-NaNO2 system is $10^8$, which is also associated with the regularity of the opal structure.

The first and second conductive plates 24, 28 are made of any electrically conductive material, such as but not limited to metals, alloys, copper, silver, gold, steel, iron, and the like. The opal and sodium nitrite dielectric material 30 has a substantially constant relative permittivity of $1 \times 10^8$ at a temperature range of 550K to 600K (Kelvin), as described in LETTER TO THE EDITOR "The giant dielectric constant of opal containing sodium nitrate nanoparticles" which is incorporated herein by reference in its entirety. This translates to an increase of relative permittivity of about 10,000 greater than barium titanate which is commonly used in available capacitors. The NaNO2 component of the dielectric material 30 is kept molten while the opal component is not. The NaNO2 is kept in a molten state by a heating element or heating band 32. The heating element 32 is controlled by the control system 16.

The outer shell 20 is insulated by the insulated shell 21 and is completely sealed to produce a leakproof enclosure. The outer shell 20 holds the insulated shell 21 in place and it contains any debris in the event of the molten dielectric capacitor 10 self discharges. The insulated shell 21 is made of an insulating material having an R value sufficient to keep the dielectric material 30 at its operating temperatures with minimal external heat from a heat source or it can be a vacuumed chamber formed between another shell. The heat source can be a heating element incorporated into the design of the molten dielectric capacitor 10 or an external heat source.

Figure 3:
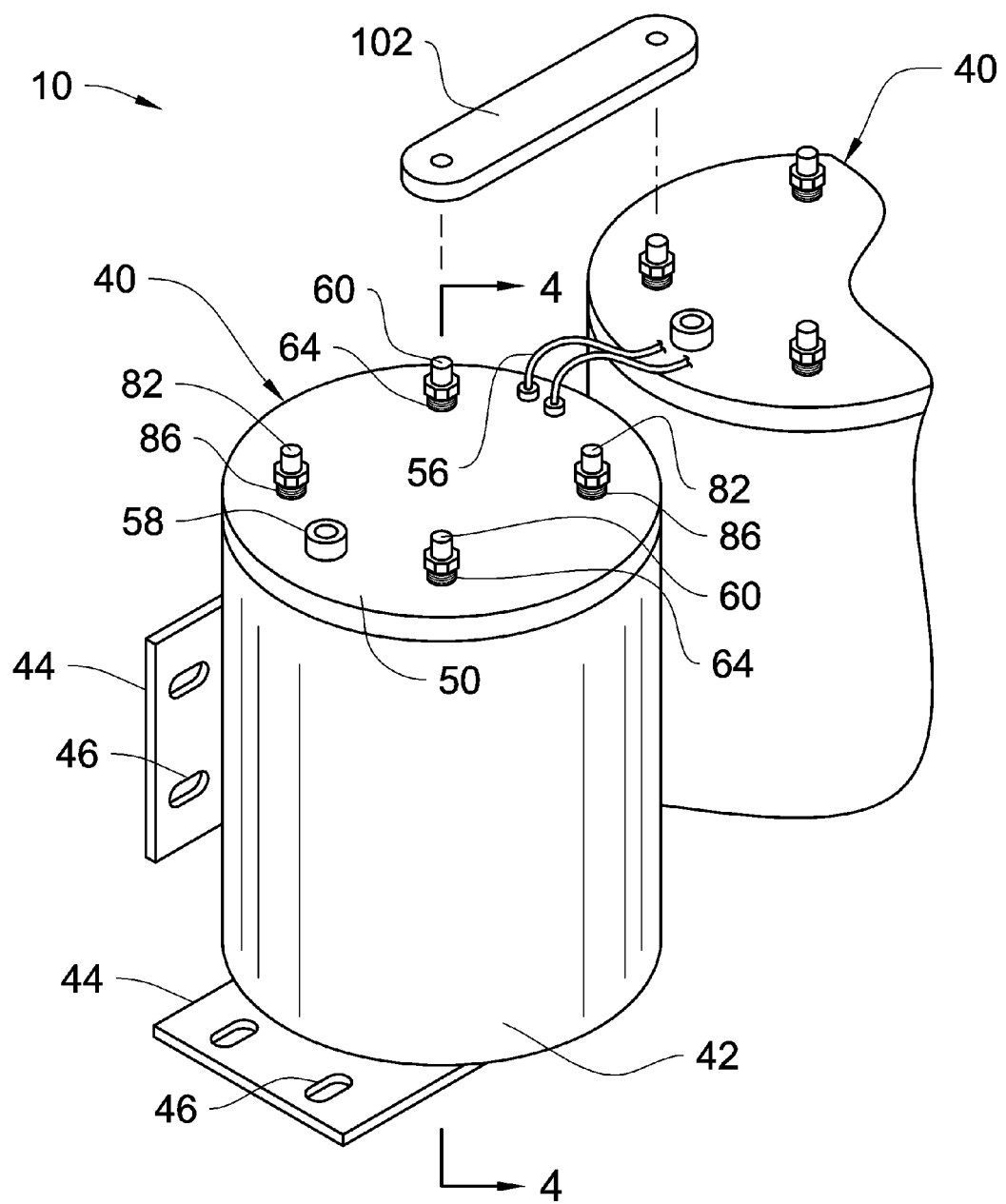
FIG. 3 is a perspective view of the molten dielectric capacitor energy storage system of the present invention.

As best illustrated in FIG. 3, an alternate embodiment molten dielectric capacitor 40 has an outer shell 42, mounting brackets 44, a cover 50, first conductive (positive) terminals 60, second conductive (negative) terminals 82, a valve/vent 58, and heater power wires 56. Multiple molten dielectric capacitors 40 can be arranged to form a bank of molten dielectric capacitors 40 with their respective first and second conductive terminals 60, 82 connected by jumpers 102. The mounting brackets 44 each have multiple slots 46 for receiving a fastener therethrough thereby allowing the molten dielectric capacitor 40 to be secured to a structure of the vehicle 12 or to any other suitable fixture. The mounting brackets 44 can also serve as a grounding connection for the molten dielectric capacitors 40. One mounting bracket 44 is located on side of the outer shell 42, and another mounting bracket is located on the bottom of the outer shell 42. It can be appreciated that multiple mounting brackets 44 can be located or secured to the outer shell 42 at other locations than what is described and illustrated.

The outer shell 42 has a substantially cylindrical configuration with an opened top. Other geometric shapes such as rectangular or polygonal can be used for the outer shell 42. The outer shell 42 can be any suitable, sturdy opened container having a hollow interior, and can be made of metal, plastic, composites, or curable materials.

The cover 50 is releasably and securely connected to the outer shell 42 via a sealable connection 43 which prevents the entrance or exit of fluids, liquids or gases. The sealable connection 43 can be, but not limited to, a threaded connection, a ratcheting connection, a latched connection, or a pressure fitted connection. A seal (not shown) may be used along the connection 43. The heater power wires 56 pass through the cover 50 through a sealed connection, and the valve/vent 58 is located in the cover. The valve/vent 58 is not limited to being located in the cover, but can be located anywhere in the outer shell 42 with communication to the interior thereof.

Figure 4:
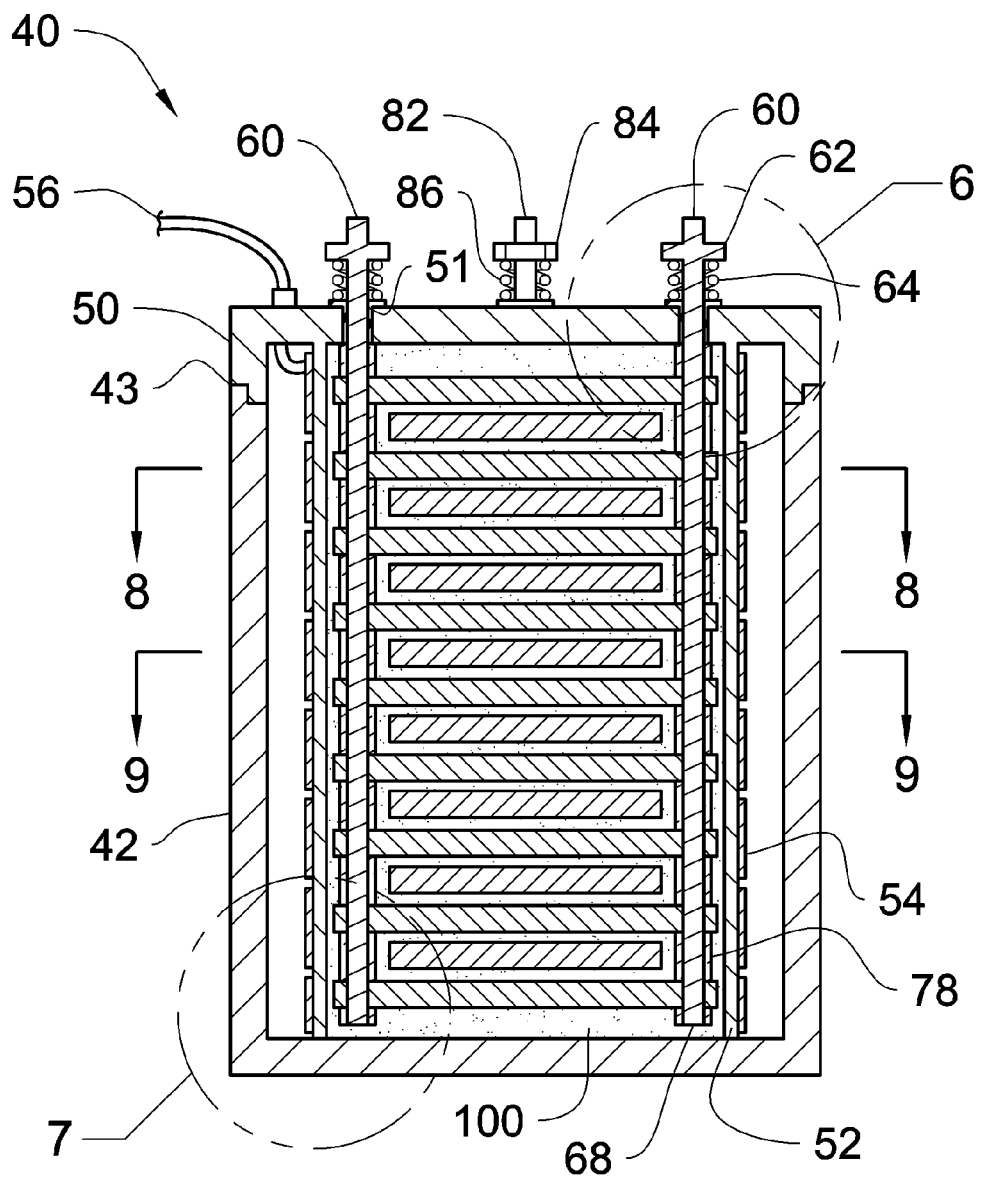
FIG. 4 is a cross sectional view of the molten dielectric capacitor energy storage system of the present invention taken along line 4-4 in FIG. 3.
Figure 5:
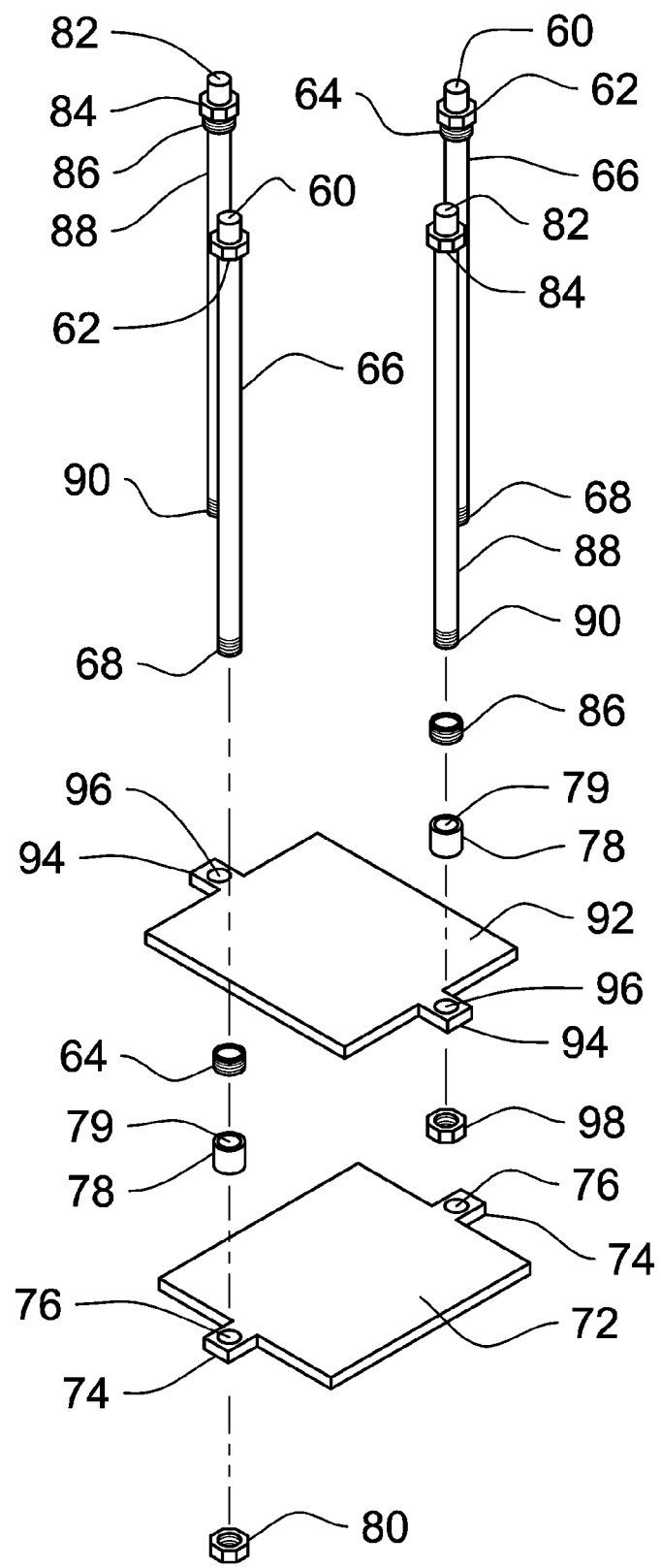
FIG. 5 is an exploded perspective view of the first and second conductive plates of the molten dielectric capacitor energy storage system of the present invention.
Figure 8:
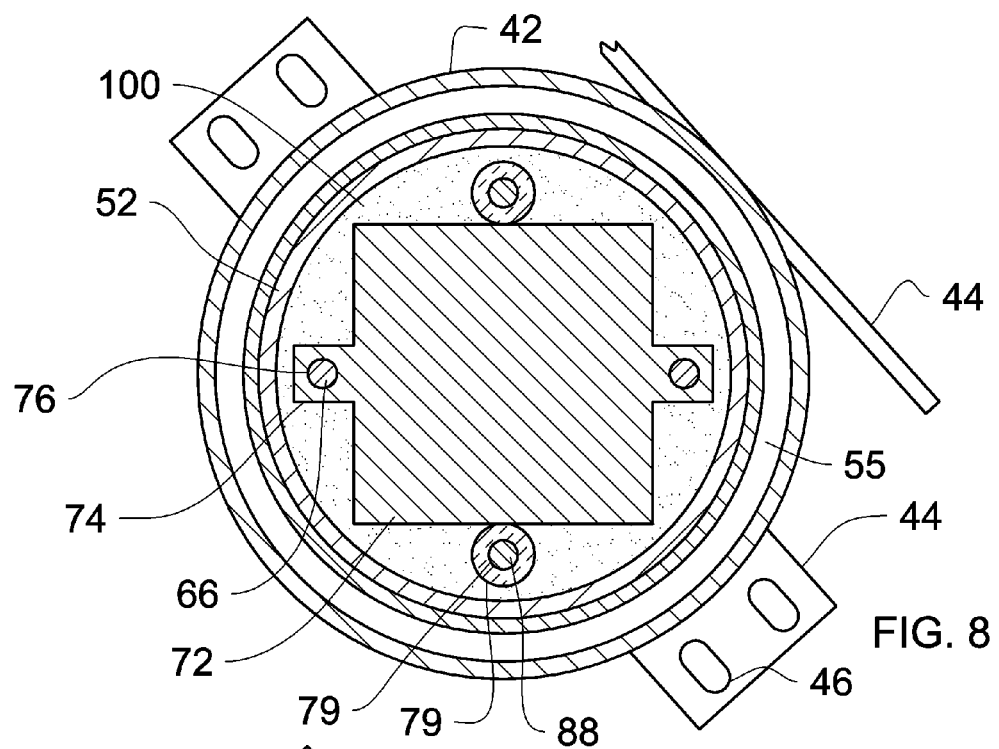
FIG. 8 is a cross sectional view of the molten dielectric capacitor energy storage system of the present invention taken along line 8-8 in FIG. 4.

An inner shell 52, as best illustrated in FIG. 4, extends down from the cover 50 so as to come in a sealable contact with the bottom of the outer shell 42 when the cover 50 is fitted to the outer shell 42. Alternatively, the inner shell 52 can extend up from the bottom of the outer shell 42 so as to come in a sealable contact with the underside of the cover 50. A gap 55 is defined between the inner shell 52 and the outer shell 42 when the inner shell 52 is inserted into the hollow interior of the outer shell 42. A heating element 54 is attached to the outer circumference of the inner shell 52 so as to be located in the gap 55 between the inner shell 52 and the outer shell 42 when they are assembled. The heating element 54 is connected to the heater power wires 56. The heating element 54 can be, but is not limited to, an electrical heating element, a heating blanket, a plurality of heating bands, a heating sleeve, a thermal medium encased in a shell attached to the inner shell 52, or an external heating source provided to the inner shell 52. The connection between the inner shell 52 and the outer shell 42 is adapted to prevent the entrance of fluids, gases, or liquids from the gap 55 into the interior of the inner shell 52, or the escape of fluids, gases, or liquids from the interior of the inner shell 52 to the gap 55.

The molten dielectric capacitor 40 consists of an array of first conductive plates 72 and second conductive plates 92 oriented in a stacked relationship with each other and positioned within the interior of the inner shell 52. The first and second conductive plate arrays are removably secured to their respective first and second conductive terminals 60, 82 which are located on the opposite side of the cover 50 through first conductive (positive) jumper bars or electrodes 66 and second conductive (negative) jumper bars or electrodes 88.

Each of the first conductive terminals 60 is located on a head 62 which is larger in size that the first conductive terminal 60. Each of the first conductive jumper bars 66 is secured to the head 62, opposite the first conductive terminal 60. The head 62 has a shape configured to be operated by a wrench, socket tool or hand, and the first conductive jumper bar 66 has a substantially cylindrical shape with a threaded end 68. A first terminal spring 64 is positioned over each of the first conductive jumper bars 66 until it comes into contact with the head 62. The first conductive jumper bars 66 are then inserted, threaded end 68 first, through a corresponding hole 51 in the cover 50. A seal 70 is located in the hole 51 of the cover 50 to prevent fluids, gases or liquids from passing through the hole 51 when the first conductive jumper bars 66 are inserted, as best illustrated in FIG. 6. The seal 70 can extend up and over the top of the cover 50 and is made of a non-conductive material. At least two first conductive jumper bars 66 are used to produce a first conductive plate array. One first conductive jumper bar 66 is positioned in parallel with it corresponding first conductive jumper bar 66. Each first conductive jumper bar 66 is inserted through their respective hole 51 in the cover 50 until the first terminal spring 64 comes in contact with the cover 50 or the top of the seal 70.

The first conductive plate array consists of multiple first conductive (positive) plates 72 connected to and in electrical communication with the first conductive jumper bars 66 in a spaced relationship providing a gap between each first conductive plate 72. Each first conductive plate 72 has a substantially rectangular configuration with at least two ears 74 located at opposite ends of each other and which extends out from the first conductive plate 72. Each ear 74 has a bore 76 therethrough adapted to slidably receive and maintain an electrical communication with the first conductive jumper bar 66. The ears 74 are oriented on the first conductive plate 72 so as to align with the two parallel first conductive jumper bars 66 when inserted through the cover 50. Each first conductive plate 72 is sized to fit between the inserted first conductive jumper bars 66. It can be appreciated that other geometric shapes can be used for the first conductive plates 72.

Insulated spacers 78 are used to produce the desired gap between adjacent first conductive plates 72 and the cover 50. Each of the insulated spacers 79 has a bore 79 therethrough adapted to receive the first conductive jumper bar 66. Insulated threaded end caps 80 are used to secure all the first conductive plates 72 and insulated spacers 78 to the cover 50. Each insulated threaded end cap 80 has a threaded bore therein or therethrough, and has an outer geometric configuration adapted to be operated by a wrench, socket tool or hand. The threaded bore is adapted to securely operate with the threaded end 68 of each first conductive jumper bar 66, as best illustrated in FIG. 6, thereby clamping the first conductive plates 72 and spacers 78 to the cover 50. The insulated spacers 78 and end cap 80 are available in multiple lengths, thereby providing a varying configuration of first conductive plates 72 and distances therebetween.

Each of the second conductive (negative) terminals 82 is located on a head 84 which is larger in size that the second conductive terminal 82. Each of the second conductive jumper bars or electrodes 88 is secured to the head 84, opposite the second conductive terminal 82. The head 84 has a shape configured to be operated by a wrench, socket tool or hand, and the second conductive jumper bar 88 has a substantially cylindrical shape with a threaded end 90. A second terminal spring 86 is positioned over each second conductive jumper bar 88 until it comes into contact with the head 84. The second conductive jumper bars 88 are then inserted, threaded end 90 first, through a corresponding hole 51 in the cover 50. Another non-conductive seal 70 is located in the hole 51 of the cover 50 to prevent fluids, gases, or liquids from passing through the hole 51 when the second conductive jumper bars 88 are inserted. At least two second conductive jumper bars 88 are used to produce a second conductive plate array. One second conductive jumper bar 88 is positioned in parallel with the second conductive jumper bar 88. The parallel second conductive jumper bars 88 are positioned perpendicular to the parallel first conductive jumper bars 66. Each second conductive jumper bar 88 is inserted through their respective hole 51 in the cover 50 until the second terminal spring 86 comes in contact with the cover 50 or the seal 70.

The second conductive plate array consists of multiple second conductive plates 92 positioned on the second conductive jumper bars 88 in a spaced relationship providing a gap between each second conductive plate 92. Each second conductive plate 92 has a substantially rectangular configuration with at least two ears 94 located at opposite ends of each other and which extends out from the second conductive plate 92. Each ear 94 has a bore 96 therethrough adapted to slidably receive and maintain an electrical communication with the second conductive jumper bar 88. The ears 94 are oriented on the second conductive plate 92 or the second conductive plates 92 are orientated so as to align with the two second conductive jumper bars 88 when inserted through the cover 50. Each second conductive plate 92 is orientated to fit between the first conductive jumper bars 66. It can be appreciated that other geometric shapes can be used for the second conductive plates 92.

Insulated spacers 78 are used to produce the desired gap between adjacent second conductive plates 92 and the cover 50, as described above for the first conductive plates 72. Spacers 78 of different lengths are used to provide sufficient space between the second conductive plate array and the first conductive plate array so as to provide a gap therebetween. Insulated threaded end caps 98 are used to secure all the second conductive plates 92 and insulated spacers 78 to the cover 50, thereby clamping the second conductive plates 92 and spacers 78 to the cover 50. Each insulated threaded end cap 98 has a threaded bore therein or therethrough, and has an outer geometric configuration adapted to be operated by a wrench, socket tool or hand. The threaded bore is adapted to securely operate with the threaded end 90 of each second conductive jumper bar 88. The insulated spacers 78 and end cap 98 are available in multiple lengths, thereby providing a varying configuration of second conductive plates 92 and distances therebetween.

To assembly the first and second conductive plate arrays to the cover 50 the first terminal springs 64 are slide over each of the first conductive jumper bars 66 respectively until the spring 64 comes in contact with the head 62. The second terminal springs 86 are slide over each of the second conductive jumper bars 88 respectively until the spring 86 comes in contact with the head 84. One of the first conductive jumper bars 66 is inserted into one of the receiving holes 51 in the cover 50 until the spring 64 comes in contact with the cover 50. The other first conductive jumper bar 66 is inserted into the receiving hole 51 in the cover 50 that is parallel with the first inserted first conductive jumper bar 66, until the spring 64 comes in contact with the cover 50. One of the second conductive jumper bars 88 is inserted into one of the free receiving holes 51 in the cover 50 until the spring 86 comes in contact with the cover 50. The other second conductive jumper bar 88 is inserted into the receiving hole 51 in the cover 50 that is parallel with the first inserted second conductive jumper bar 88 and perpendicular with the first conductive jumper bars 66, until the spring 86 comes in contact with the cover 50.

Insulated spacers 78 having a first length are positioned on each of the first conductive jumper bars 66 until they come in contact with the cover 50 opposite the first terminal spring 64. One first conductive plate 72 is positioned between the first conductive jumper bars 66 so that each of the bores 76 of ears 74 receives one first conductive jumper bar 66. The first conductive plate 72 is slid along the first conductive jumper bar 66 until it comes in contact with the installed insulated spacers.

Then, insulated spacers 78 having a second length which is longer than the first installed spacers are positioned on each of the second conductive jumper bars 88 until they come in contact with the cover 50 opposite the second terminal spring 86. One second conductive plate 92 is positioned between the second conductive jumper bars 88 so that each of the bores 96 of ears 94 receives one second conductive jumper bar 88. The second conductive plate 92 is slid along the second conductive jumper bar 88 until it comes in contact with the first second conductive bar installed insulated spacers.

Additional spacers 78, first conductive plates 72, and second conductive plates 92 are installed in an alternating sequence until a desired amount of first and second conductive plates 72, 92 are installed on their respective jumper bars 66, 88. When the final first and second conductive plates 72, 92 are installed then the insulated threaded end caps 80, 98 are threadably secured to their respective threaded ends 68, 90 of the first and second conductive jumper bars 66, 88. To secure the first and second conductive plates 72, 92 to the cover 50, each of the end caps 80, 98 are individually operated by a wrench, socket tool or by hand while its corresponding head 62, 84 is tightened. This action forces the first and second conductive plates 72, 92 toward their adjacent spacers 78 and then toward the cover 50, while their respective springs 64, 86 forces the first and second heads 62, 84 away from the cover 50 thereby pulling the first and second conductive jumper bars 66, 88 and squeezing the first and second conductive plate 72, 92 and spacers against the cover 50. Additionally, the first and second terminal springs 64, 86 are also used to compensate for any thermal expansion of their respective first and second conductive plates, 72, 92, spacers 78, and first and second conductive jumper bars 66, 88.

The assembled first and second conductive plate arrays, inner shell 52, and heating element 54 are inserted into the outer shell 42 and the cover 50 is secured to the outer shell 42 via sealable connection 43. Molten o-NaNO2 dielectric material 100 is introduced into the interior of the inner shell 52 so that the first and second conductive plate arrays and the gaps therebetween are completely encased by the molten o-NaNO2 dielectric material 100. Any gases or fluids in the gap 55 formed between the inner shell 52 and the interior of the outer shell 42 are removed therefrom forming a vacuum. The first and second conductive terminals 60, 82 are then connected to the control system 16 via wiring 18 or to other molten dielectric capacitor energy storage systems 40 via the jumper 102. The heating element 54 is connected to a power source or to the control system 16 via heater power wirings 56. The valve/vent 58 can be an automatic venting valve for relieving pressure from the interior of the inner shell 52, or it can be a valve used for filling the interior of the inner shell 52 with the o-NaNO2 dielectric material 100 in liquid or molten form.

The heating element 54 is used to keep the dielectric material 100 in a molten state, and the vacuumed gap 55 assists in the insulation of the molten dielectric material 100. The heating element 54 is able to maintain the molten dielectric material 100 at a temperature of about 550K to 600K, thereby producing a dielectric constant of about $10^8$ for the dielectric material 100, as described further herebelow.

Figure 9:
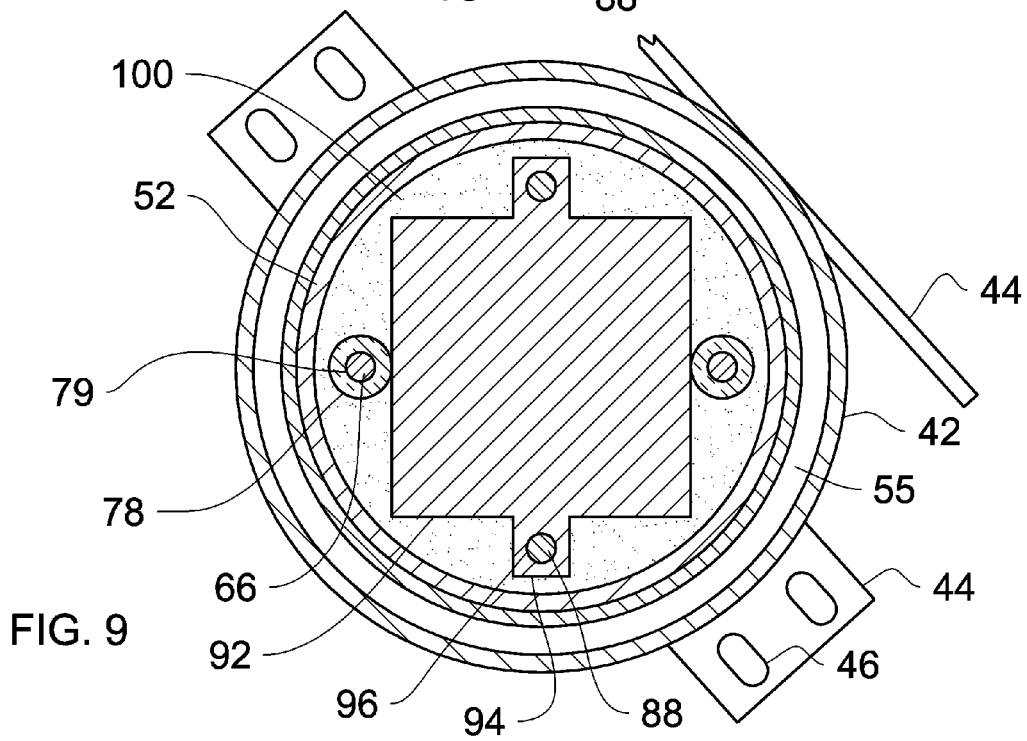
FIG. 9 is a cross sectional view of the molten dielectric capacitor energy storage system of the present invention taken along line 9-9 in FIG. 4.
Figure 10:
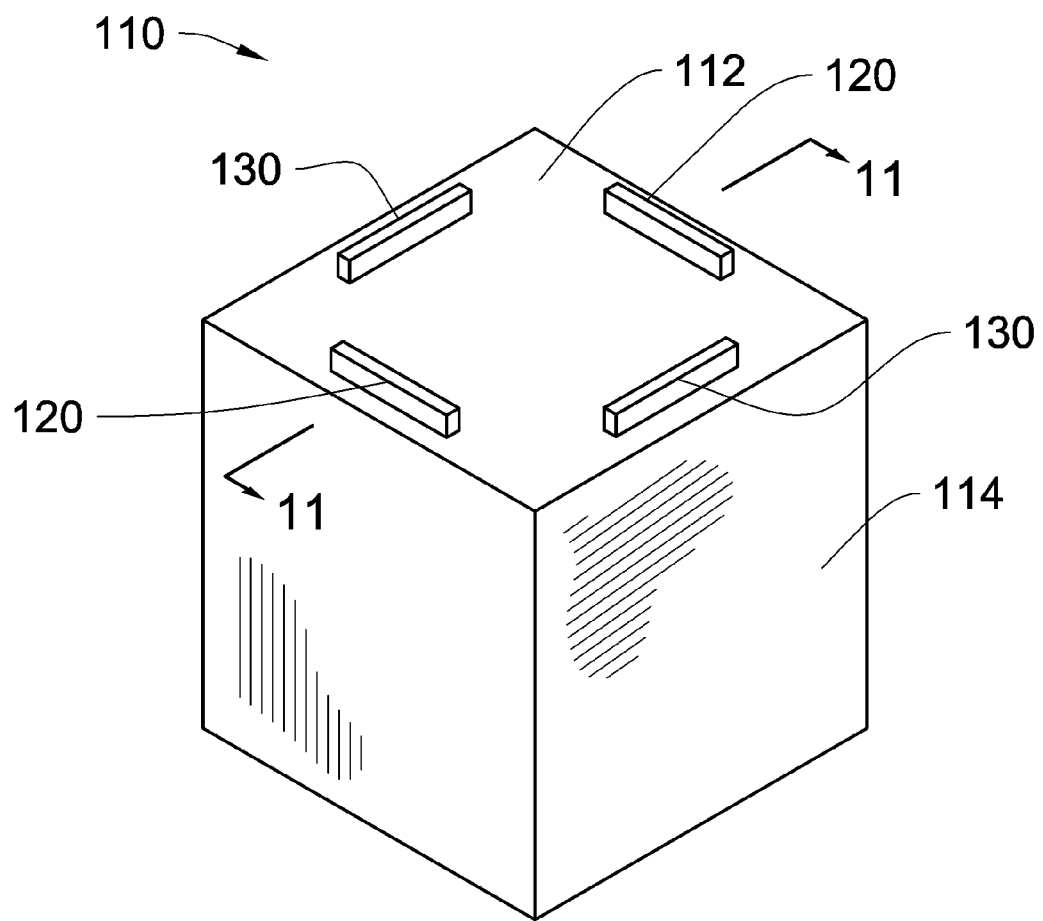
FIG. 10 is a perspective view of an alternate embodiment of the molten dielectric capacitor energy storage system of the present invention.

As best illustrated in FIG. 9, an alternate embodiment molten dielectric capacitor 110 has an outer shell 112 featuring sides 114, first conductive terminals 120, and second conductive terminals 130. Multiple molten dielectric capacitors 110 can be arranged to form a bank of molten dielectric capacitors 110 with their respective first and second conductive terminals 120, 130 connected by a jumper (not shown).

The outer shell 112 has a substantially closed rectangular configuration, but other geometric shapes such as cylindrical or polygonal can be used. The outer shell 112 can be any suitable, sturdy closed container having a hollow interior made of metal, plastic, composites, or curable materials.

Figure 11:
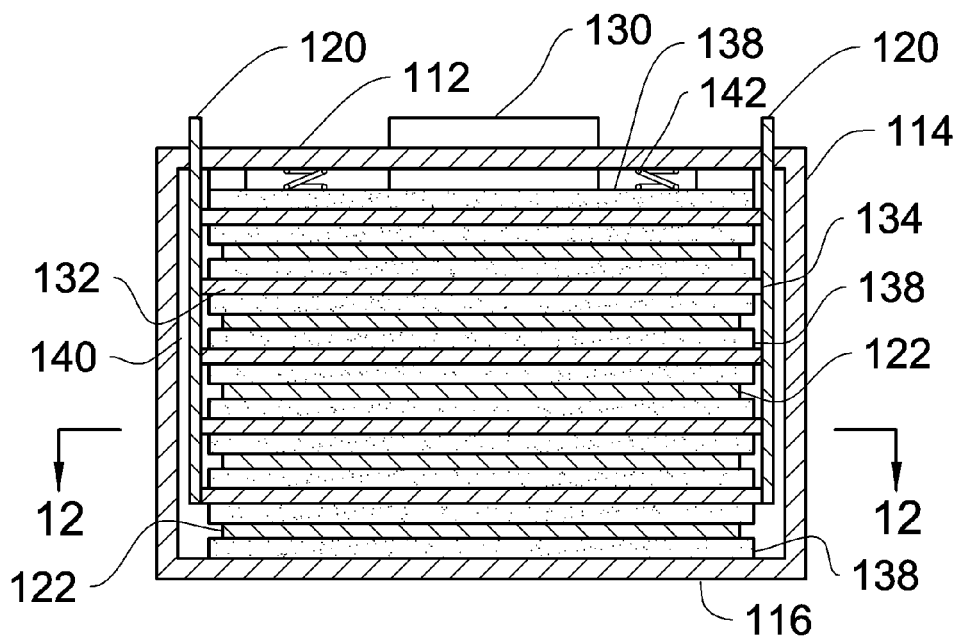
FIG. 11 is a cross sectional view of the alternate embodiment molten dielectric capacitor energy storage system of the present invention taken along line 11-11 in FIG. 10.

As best illustrated in FIG. 11, the alternate embodiment molten dielectric capacitor 110 consists of an array of first conductive (positive) plates 122 and second conductive (negative) plates 132 oriented in a stacked alternating relationship with each other and positioned within the interior of the outer shell 112. The first and second conductive plates 122, 132 are secured to their respective first and second conductive terminals 120, 130 which protrude out from the outer shell 112. An o-NaNO2 dielectric material plate 138 is positioned between each first and second conductive plate 122, 132 and the interior of the outer shell 112.

The first conductive terminals 120 extend down into the interior of the outer shell 112 to form a first conductive jumper bar that is connected to a plurality of first conductive plates 122 via a plate extension 124 located on opposite sides of each of the first conductive plates 122. Located on either side of the first conductive plate 122 is an o-NaNO2 dielectric material plate 138. The first conductive plate extensions 124 allow the first conductive terminal jumper bar 120 to pass on the outer edge of the dielectric material plates 138.

The second conductive terminals 130 extend down into the interior of the outer shell 112 to form a second conductive jumper bar that is connected to a plurality of second conductive plates 132 via a plate extension 134 located on opposite sides of each of the second conductive plates 132. Each of the second conductive plates 132 is positioned between dielectric material plates 138, thereby producing an array of first and second conductive plates 122, 132 with dielectric material plates 138 located therebetween. The second conductive plate extensions 132 allow the second conductive terminal jumper bar 130 to pass on the outer edge of the dielectric material plates 138. The second conductive terminal jumper bars 130 are perpendicularly oriented to the first conductive terminal jumper bars 120.

Figure 12:
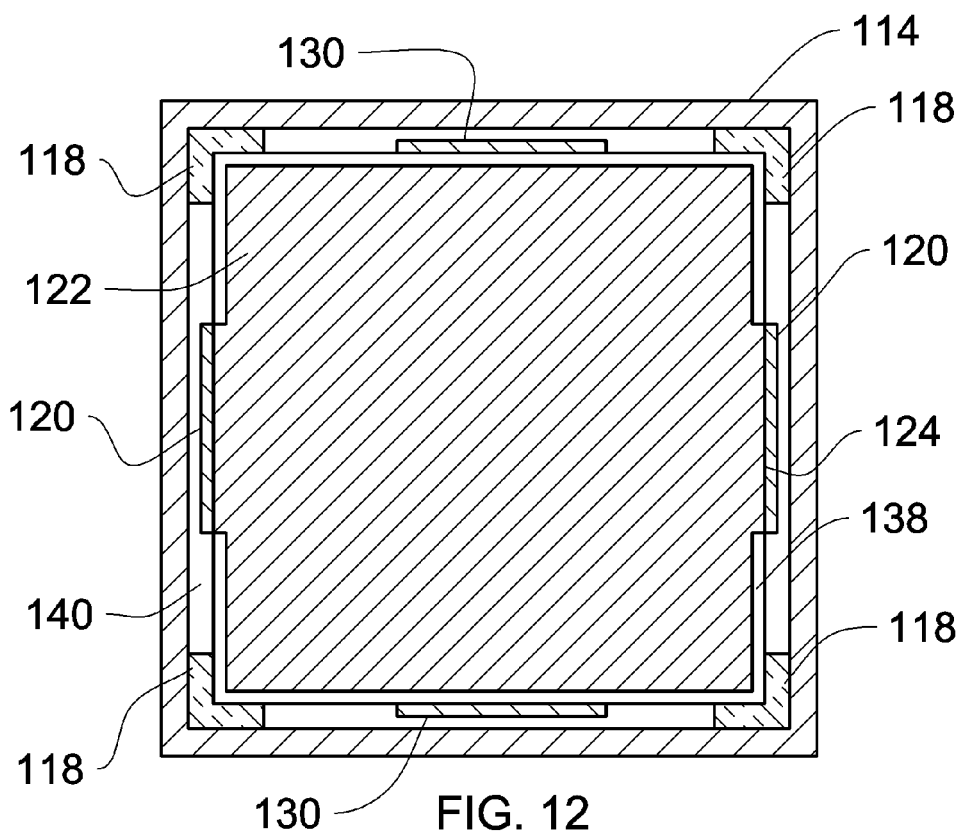
FIG. 12 is a cross sectional view of the alternate embodiment molten dielectric capacitor energy storage system of the present invention taken along line 12-12 in FIG. 11.

Corner alignment brackets 118 are located in each interior corner of the outer shell 112, as best illustrated in FIG. 12, and can be made of an insulated material. The corner alignment brackets 118 securely hold and align the dielectric material plates 138 in position. By holding the dielectric material plates 138 instead of the first and second conductive plates 122, 131, the plates can be made very thin (i.e. aluminum foil) and the weight and size of the capacitor 110 can be reduced.

Compression springs 142 are positioned between the outer shell 112 and the upper most dielectric material plate 138. The compression springs 142 can be, but are not limited to, helical springs or leaf springs. The compression springs 142 provide a constant force against first and second conductive plates 122, 132 and the dielectric material plates 138 to compensate for thermal expansion of the conductive and dielectric plates.

Using the above-describe molten dielectric capacitor energy storage system 10, 40, 110, the following description is provided to demonstrate the improvements of using the o-NANO2 dielectric material 30, 100, 138 as a viable and efficient energy storage system for vehicles as compared with gasoline or NiMH batteries.

With o-NaNO2 having a relative permittivity (dielectric constant) of $1 \times 10^8$ at Direct Current (DC), its permittivity is constant with increasing electric field strength, and that o-NaNO2 will withstand a field strength of 4 V/um without breakdown. Then the following relationship (Equation 1) is used to determine the capacitance of a capacitor:

$$C = E_o E_r A/L \qquad \text{Equation 1}$$

where $$E_o = 8.85 \times 10^{-12} \text{ F/m}$$

A suitable vehicle energy storage device would need to store about 50 KWHr of energy. With 1 J-1 watt second, from which follows:

$$50 \text{ KW} \times 3600 \text{ seconds/hr} = 180 \text{ MJ} \qquad \text{Equation 2}$$

Assuming that the molten dielectric capacitor 10, 40, 110 is operated at 4000 volts. Then the following relationship (Equation 4) is used to determine the amount of capacitance for which a potential difference of one volt results in a static charge of one coulomb with the energy stored in the capacitor (Equation 3):

$$E = \tfrac{1}{2} C V^2 \qquad \text{Equation 3}$$

From which follows:

$$C = 2E/v^2 = 2(180 \times 10^6 \text{ J})/(4000^2) = 22.50 \text{ Farads} \qquad \text{Equation 4}$$

Assuming the first and second conductive plates 24, 28, 72, 92, 122, 132 have a plate size of 30 cm×30 cm and a separation of 1 mm and an Er of $10^8$ then the number of plates needed is (Equation 6):

$$C = 8.85 \times 10^{-12} \times 10^8 \times 0.30^2 / 0.001 = 0.08 \text{ Farads} \qquad \text{Equation 5}$$

$$22.5 \text{ Farads}/0.08 \text{ Farads} = 281 \text{ plates} \qquad \text{Equation 6}$$

$$281 \text{ plates} \times 0.002 \text{ m/plate} = 0.56 \text{ m} \qquad \text{Equation 7}$$

$$4 \text{ KV}/0.001 \text{ m} = 4 \times 10^6 \text{ V/m} \qquad \text{Equation 8}$$

Using that the density of aluminum 2.7 g/cm³, the density of Opal of about 2.1 g/cm³, then the density of the capacitor core, assuming the first and second conductive plates are 1 mm thick, is (Equation 9):

$$2.1 + 2.7/2 = 2.4 \text{ g/cm}^3 \qquad \text{Equation 9}$$

The capacitor core weight can then be determined by the following (Equation 10):

$$0.3 \times 0.3 \times 0.56 \times 2.4 \times 1000 \text{ kg/m}^3 = 121 \text{ Kg} \qquad \text{Equation 10}$$

Power density=Energy/Weight=50 KWHrs/121 Kg=400 Wh per Kg. This compares favorably with conventional rechargeable batteries that have an Energy density of about 100 Wh per Kg. It can be appreciated that the molten dielectric capacitor 110 containing aluminum foil conductors 122, 132 is lighter than the first and second embodiment molten dielectric capacitors 10, 30 because there will be less material in the conducting plates.

As the conducting plate thinness goes to zero, as will be practical in the molten dielectric capacitor 110, the density will fall to 0.21 and the thickness will fall to 0.28 cm, yielding:

$$\text{Weight} = 0.3^2 \times 0.28 \times 0.21 = 52.9 \text{ Kg}$$

Energy stored is still 50 KWHrs.

Energy Density is 50 KWHrs/52.9 Kg=0.945 KWHr per Kg

It can then be calculated that a small automobile uses about 200 watt hours per mile of energy at highway speeds. 50 KwHrs/200 watt hours per mile=250 miles of range.

This is then compared with a standard NiMH battery used in electric vehicles, which has an energy weight density of 70 Watt hours per Kg. It can therefore be appreciated that the molten dielectric capacitor 10, 40, 110 of the present invention has an energy density 6× greater than the standard NiMH battery.

It can therefore be appreciated that the molten dielectric capacitor 10, 40, 110 of the present invention is desirable for storing electrical energy for an electric vehicle because of its simple design and high energy density.

Any capacitor voltage drop that occurs during discharge can be offset by voltage enhancement or control. Capacitors are governed by the equation $E = \tfrac{1}{2} C V^2$, wherein E is the energy stored in the capacitor, C is the capacitance of the capacitor, and V is the voltage of the capacitor.

A standard capacitor has a constant or non-controllable capacitance value, wherein the capacitor voltage (V) declines as the charge in the capacitor (E) decreases. The molten dielectric capacitor 10, 40, 110 of the present invention does not suffer from this same drop in voltage as the capacitor is discharged. This is achieved by that the molten dielectric capacitor 10, 40, 110 of the present invention is controllable, because the capacitance is dependent on the temperature of the o-NaNO2 dielectric material 30, 100, 138 which is controlled by the heating element 54.

Figure 13:
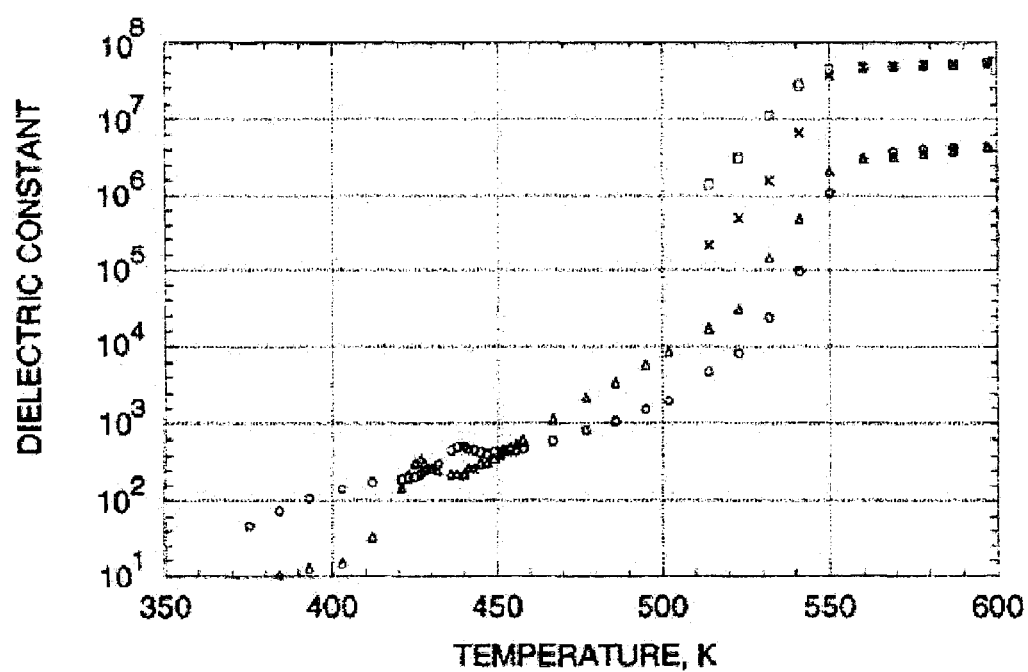
FIG. 13 is a reproduction of FIG. 2 from LETTER TO THE EDITOR "The giant dielectric constant of opal containing sodium nitrate nanoparticles".

As shown in FIG. 13 from LETTER TO THE EDITOR "The giant dielectric constant of opal containing sodium nitrate nanoparticles", as the temperature of o-NaNO2 is decreased, so does its capacitance. Therefore, as the temperature of the o-NaNO2 dielectric material 30, 100, 138 of the molten dielectric capacitor 10, 40, 110 is increased, so does the capacitance of the capacitor. Additionally, when the temperature of the o-NaNO2 dielectric material 30, 100, 138 is maintained at a temperature of 550 K-600 K by way of the heating element 54, then the capacitance of the molten dielectric capacitor 10, 40, 110 is substantially constant at about $10^8$.

Thus given the equation V=Q/C, if the capacitance of the capacitor (C) is decreased in the same ratio as the charge is depleted (Q) then the capacitor voltage (V) can be kept substantially constant. This is accomplished by decreasing the temperature of the o-NaNO2 dielectric material 30, 100, 138. With reference to FIG. 13 the dielectric constant changes by a factor of 100 ($10^8$ to $10^6$) from 550 K to about 525 K respectively. A simple change in the capacitance temperature of 25 K will allow the molten dielectric capacitor 10, 40, 110 to output a substantially constant voltage across a charge ratio of 100:1. From being fully charged (Q=100%) down to almost fully discharged (Q=1%).

This is advantageous because devices, such as electric vehicles, need to operate in a predefined voltage range for maximum performance and efficiency. For example, if a typical capacitor was powering an electric motor that required 400 VDC to develop maximum power with a capacitor fully charged, it will operate significantly less than optimal when the capacitor voltage dropped to 300, 200 and 100 VDC as it discharges.

With reference to the above example, if the molten dielectric capacitor 10, 40, 110 was used in place of the standard capacitor then the temperature of the dielectric material 30, 100, 138 could be decreased. Resulting in a decrease in capacitance and an increase in capacitor output voltage, thereby maintaining a substantially constant 400 VDC to the electric motor 14 of the vehicle 12 so as to operate at optimal performance.

A major disadvantage and hurdle with standard and prior art capacitors is keeping the output voltage constant as they discharge. It is known in the industry and one skilled in the art that this hurdle is solved by using capacitors having a much higher voltage than the load requires, thereby making the capacitor still usable as they discharge. A disadvantage of this solution is that the capacitor can not be fully discharged, with the limit of their discharge being associated with the operating voltage of the device the capacitor is powering. A further disadvantage of the above solution is in that using a high voltage capacitor the device must also have electronics and circuitry able to handle the higher voltage. This leads to an increase cost of manufacture. The molten dielectric capacitor 10, 40, 110 of the present invention overcomes all the disadvantages of present solutions, by changing the temperature of o-NaNO2 dielectric material 30, 100, 138.

To decrease the powered needed to operate the heating element 54 used to keep the o-NaNO2 dielectric material 30, 100, 138 greater than 550 K, the vacuumed gap 55 is used to insulate the inner shell 52 which contains the o-NaNO2 dielectric material. Insulating material can be used in place of the vacuumed gap 55. The vacuumed gap 55 will assist in keeping the power needed to operate the heating element 54 at a minimum, thereby leaving more power to operate the load (electric motor) 14.

The outer and inner shells 20, 42, 52, 112 and the cover 50 are preferably made of metal, thereby providing a conductive ground shield around the voltages stored on the molten dielectric capacitor 10, 40, 110. Furthermore, since the outer and inner shells 20, 42, 52, 112, and the cover 50 are conductive and grounded when mounting to the vehicle 12, it would thereby prevent any stray voltages to develop if the capacitor core (interior of the inner and outer shells) were to be penetrated. Thus providing a safety feature for the occupants of the vehicle 12 in the event of an accident.

There may be times when a user would not want to keep the molten dielectric capacitor 10, 40, 110 charged because of the heat energy required to keep the dielectric material 30, 100, 138 at the required temperature. If this situation arises, then the DC energy from the molten dielectric capacitor is converted to AC via an inverter/converter (not shown) which can then be connected to and supply energy to the AC grid. Furthermore, the control system 16 may include an inverter/converter which can match the voltage and frequency requirements of the AC grid which the molten dielectric capacitor is attached to.

Thus the vehicle 12 with the molten dielectric capacitor 10, 40, 110 incorporated therein can be attached to a standard electric AC power grid for either charging or discharging. The user has the option of charging the molten dielectric capacitor 10, 40, 110 during low energy demand periods thereby saving money on electric charges and/or can discharge the molten dielectric capacitor 10, 40, 110 to the power grid thereby selling the energy in the molten dielectric capacitor 10, 40, 110 back to the energy company.

The molten dielectric capacitor 10, 40, 110 of vehicle 12 can also be used to power AC or DC devices in remote areas not connected to the power grid. This can be beneficial in emergency situations of power outages caused by natural disasters or in time of war. Additionally, the molten dielectric capacitor 10, 40, 110 can be connected to and charged by external power sources such as but not limited to solar panels, wind generators, and wave generators.

While a preferred embodiment of the molten dielectric capacitor energy storage system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, alloys, composites or curable materials may be used instead of the above-described materials. And although storing and providing power to a load with increased capacitor permittivity and dielectric constant have been described, it should be appreciated that the molten dielectric capacitor energy storage system herein described is also suitable for use in any electrical powered device which requires high energy capacity.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A molten dielectric capacitor energy storage system for storing and providing energy to a connectable load, said molten dielectric capacitor energy storage system comprising:

an outer shell defining a hollow interior;

at least one first conductive electrode having a first conductive terminal, and a plurality of first conductive plates, said first conductive terminal being exterior of said outer shell, said first conductive plates being parallel with each other and sequentially connectable to said at least one first conductive electrode, said first conductive plates being locatable in said hollow interior of said outer shell;

at least one second conductive electrode having a second conductive terminal, and a plurality of second conductive plates, said second conductive terminal being exterior of said outer shell, said second conductive plates being parallel with each other and sequentially connectable to said at least one second conductive electrode, said second conductive plates being disposed in alternation with said first conductive plates, said second conductive plates being locatable in said hollow interior of said outer shell;

a dielectric material consisting of a nanomatrix material and a molten ferroelectric material, said dielectric material being located in said hollow interior of said outer shell, said nanomatrix material being opal, said molten ferroelectric material being molten sodium nitrite; and a temperature control system for maintaining the temperature of the ferroelectric material in a molten phase, said temperature control system being at least one heating element configured to heat said dielectric material, said at least one heating element being fixable to an inner shell located in said hollow interior of said outer shell;

wherein said second conductive plates being adjacent said first conductive plates defining a gap therebetween.

2. The molten dielectric capacitor energy storage system as set forth in claim 1, wherein each of said at least one first and at least one second conductive electrodes are removably inserted through a defined hole in said cover, said holes each having a seal therein.

3. The molten dielectric capacitor energy storage system as set forth in claim 2, wherein each of said at least one first and at least one second conductive electrodes further comprising a head, said first and second electrode heads each having a size greater than said at least one first and at least one second conductive electrodes respectively, and said first and second electrode heads being located exterior of said outer shell.

4. The molten dielectric capacitor energy storage system as set forth in claim 3 further comprising a plurality of spacers each adapted to receive said at least one first and at least one second conductive electrodes therethrough respectively, wherein at least one of said spacers being placed between each sequentially adjacent first conductive plates and each sequentially adjacent second conductive plates, and wherein each of said first and second conductive plates further comprising at least one defined bore adapted to receive their respective said first and second conductive electrodes therethrough.

5. The molten dielectric capacitor energy storage system as set forth in claim 4 further comprising a spring located between each of said first and second electrode heads and said cover, and an end cap threadably attachable to an end of each of said at least one first and at least one second conductive electrodes opposite of said first and second electrode heads, said springs being adapted to provide a clamping and suspension force to said first and second conductive plates and spacers respectively to said cover.

6. The molten dielectric capacitor energy storage system as set forth in claim 5, wherein each of said bores of said first and second conductive plates is located in an ear extending out from said first and second conductive plates.

7. The molten dielectric capacitor energy storage system as set forth in claim 6, wherein said at least one first conductive electrode is a plurality of parallel first conductive electrodes, said at least one second conductive electrode is a plurality of parallel second conductive electrodes positioned perpendicular to said first conductive electrodes, said bore of said first conductive plates is at least two parallel bores aligned with said first conductive electrodes, said bore of said second conductive plates is at least two parallel bores aligned with said second conductive electrodes, and wherein said outer shell, said inner shell and said cover have a substantially cylindrical configuration, and said first and second conductive plates have a substantially rectangular configuration.

8. A molten dielectric capacitor energy storage system comprising:

an outer shell defining a hollow interior and an opened top;

a cover attachable and sealable to said outer shell covering said opened top, said cover having an inner shell extending outwardly therefrom into said hollow interior of said outer shell when said cover is positioned on said outer shell thereby defining a gap between said outer and inner shells;

a first conductive electrode insertable through a hole in said cover and extendable into an interior of said inner shell, said first conductive electrode having a plurality of first conductive plates in parallel with each other and sequentially connectable to said first conductive electrode, said first conductive plates being located in said hollow interior of said outer shell;

a second conductive electrode insertable through a hole in said cover and extendable into an interior of said inner shell, said second conductive electrode having a plurality of second conductive plates in parallel with each other and sequentially connectable to said second conductive electrode, said second conductive plate being disposed in said hollow interior of said outer shell and in alternation with said first conductive plates defining a gap therebetween;

a dielectric material consisting of opal and sodium nitrite located in an interior of said inner shell; and a heating element adapted to maintain said dielectric material in a molten phase, said heating element being fixed to said inner shell in said gap.

9. The molten dielectric capacitor energy storage system as set forth in claim 8 further comprising a plurality of spacers adapted to receive said first and second conductive electrodes therethrough respectively, at least one of said spacers being placed between each sequentially adjacent first conductive plates and each sequentially adjacent second conductive plates, and wherein each of said first and second conductive plates further comprising at least one defined bore adapted to receive their respective said first and second conductive electrodes therethrough.

10. The molten dielectric capacitor energy storage system as set forth in claim 9, wherein each of said first and second conductive electrodes further comprising a head, said first and second electrode heads each having a size greater than its corresponding electrode and is located exterior of said cover.

11. The molten dielectric capacitor energy storage system as set forth in claim 10 further comprising a spring located between each of said first and second electrode heads and said cover, and an end cap threadably attachable to an end of each of said first and second conductive electrodes opposite of said first and second electrode heads, said springs being adapted to provide a clamping and suspension force to said first and second conductive plates and spacers respectively.

12. The molten dielectric capacitor energy storage system as set forth in claim 11, wherein said first conductive electrode is at least two parallel first conductive electrodes, said second conductive electrode is at least two parallel second conductive electrodes positioned perpendicular to said first conductive electrodes, said bore of said first conductive plates is at least two parallel bores aligned with said first conductive electrodes, said bore of said second conductive plates is at least two parallel bores aligned with said second conductive electrodes, and wherein said outer shell, said inner shell and said cover have a substantially cylindrical configuration, and said first and second conductive plates have a substantially rectangular configuration.

13. The molten dielectric capacitor energy storage system as set forth in claim 8 further comprising multiple molten dielectric capacitor energy storage systems connectable to each other by jumpers to form a bank of said molten dielectric capacitor energy storage systems, said jumpers connecting said first conductive electrodes and said second conductive electrodes of each of said molten dielectric capacitor energy storage system respectively, said bank of molten dielectric capacitor energy storage systems being connectable to a control system adapted to charge and discharge said bank of molten dielectric capacitor energy storage system, said control system being connectable to an electric motor of a vehicle.

14. A molten dielectric capacitor energy storage system comprising:
- an outer shell defining a hollow interior and an opened top;
- a cover attachable and sealable to said outer shell covering said opened top, said cover having an inner shell extending outwardly therefrom into said hollow interior of said outer shell when said cover is positioned on said outer shell thereby defining a gap between said outer and inner shells;
- a first conductive electrode insertable through a hole in said cover and extendable into an interior of said inner shell, said first conductive electrode having a head exterior of said cover and being greater in size than said first conductive electrode;
- a plurality of first conductive plates in parallel with each other and sequentially connectable to said first conductive electrode through a bore defined in each of said first conductive plates, said first conductive plates being located in said hollow interior of said outer shell;
- a second conductive electrode insertable through a hole in said cover and extendable into an interior of said inner shell, said second conductive electrode having a head exterior of said cover and being greater in size than said second conductive electrode;
- a plurality of second conductive plates in parallel with each other and sequentially connectable to said second conductive electrode through a bore defined in each of said second conductive plates, said second conductive plate being disposed in said hollow interior of said outer shell and in alternation with said first conductive plates defining a gap therebetween;
- a plurality of spacers adapted to receive said first and second conductive electrodes therethrough respectively, at least one of said spacers being placed between each sequentially adjacent first conductive plates and each sequentially adjacent second conductive plates;
- a spring located between each of said first and second electrode heads and said cover;
- an end cap threadably attachable to an end of each of said first and second conductive electrodes opposite of said first and second electrode heads, said springs being adapted to provide a clamping and suspension force to said first and second conductive plates and spacers respectively;
- a dielectric material consisting of at least opal and sodium nitrite located in an interior of said inner shell; and
- a heating element adapted to controllably maintain said dielectric material in a molten phase, said heating element being fixed to said inner shell in said gap.

15. The molten dielectric capacitor energy storage system as set forth in claim 14, wherein said first conductive electrode is a plurality of parallel first conductive electrodes, said second conductive electrode is a plurality of parallel second conductive electrodes positioned perpendicular to said first conductive electrodes, said bore of said first conductive plates is at least two parallel bores aligned with said first conductive electrodes located in an ear extending out therefrom, said bore of said second conductive plates is at least two parallel bores aligned with said second conductive electrodes located in an ear extending out therefrom, and wherein said outer shell, said inner shell and said cover have a substantially cylindrical configuration, and said first and second conductive plates have a substantially rectangular configuration.

\* \* \* \* \*